United States Patent [19]

Wirkkala

[11] 4,333,675

[45] Jun. 8, 1982

[54] CABLE CONNECTOR

[76] Inventor: Ben Wirkkala, P.O. Box 524, Naselle, Wash. 98638

[21] Appl. No.: 109,469

[22] Filed: Jan. 4, 1980

[51] Int. Cl.³ .............................................. B66C 1/34
[52] U.S. Cl. .................................. 294/78 R; 24/122.6
[58] Field of Search ..................... 294/78 R, 74, 82 R, 294/83 R; 24/115 R, 115 M, 122.3, 122.6, 136 L, 136 K; 403/248, 250, 253; 59/86

[56] References Cited

U.S. PATENT DOCUMENTS

| | | | |
|---|---|---|---|
| 2,275,162 | 3/1942 | Sutthoff | 294/78 R |
| 2,709,616 | 5/1955 | Larson et al. | 294/78 R |
| 3,915,487 | 10/1975 | Zeiler | 294/78 R |
| 4,066,368 | 1/1978 | Mastolski et al. | 24/122.6 |

*Primary Examiner*—James B. Marbert
*Attorney, Agent, or Firm*—Seed, Berry, Vernon & Baynham

[57] ABSTRACT

A connector for securing a choker cable to a main line cable. The main line cable is fastened to a cylindrical ferrule having an axial bore through which the end of the cable passes. The bore tapers inwardly away from the end of the cable and receives a pair of semi-cylindrical nubbins having a taper matching the taper of the bore. The nubbins are positioned between the cable and the walls of the bore, and the wedging action of the nubbins with the cable and the ferrule securely fastens the cable to the ferrule yet allows the ferrule to be easily released from the cable. A generally U-shaped shackle is rotatably secured to the ferrule by a pair of pins projecting diametrically from the ferrule into respective bores formed in opposite legs of the shackle. One or more choker cables are fastened to the shackle by loops formed at the ends of the choker cables which surround the curved portion of the shackle.

1 Claim, 3 Drawing Figures

CABLE CONNECTOR

BACKGROUND OF THE INVENTION

1. Field of the Invention

This application relates to the field of logging, and more particularly to a connector structure for releasably securing a choker cable to a main line cable which typically extends from a winch or yarder drum.

2. Description of the Prior Art

In a typical logging operation individual logs or bundles of logs are secured to a choker cable. One or more choker cables are then fastened to a generally U-shaped shackle by passing the shackle through loops spliced at the ends of the choker cables. A main line cable extending from a skidder-mounted winch or yarder drum is secured to the shackle in a similar manner by splicing a loop at the end of the main line cable through which a shackle pin passes. The ends of the shackle pin terminate at opposite legs of the shackle.

The primary disadvantage of the above-described conventional technique for securing choker cables to a main line cable is the difficulty in splicing loops at the ends of the cables. Forming a loop by cable splicing is a fairly difficult task and requires a great deal of time even for a skilled workman. Each time a main line cable breaks—a fairly common occurrence—a new loop must be spliced at the end of the cable.

SUMMARY OF THE INVENTION

The primary object of the invention is to provide a connector for allowing a cable to be quickly and easily secured to a shackle.

It is another object of the invention to provide a connector to which a cable may be quickly and easily released and then resecured with a minimum of cable preparation.

It is still another object of the invention to provide a connector to which a cable may be secured by relatively unskilled labor.

These and other objects of the invention are provided by a connector which adapted to be secured to the end of the cable. The cable is secured to a generally cylindrical ferrule having a pair of pins projecting diametrically from opposite sides thereof. The pins are slidably received in respective bores formed at the ends of a generally U-shaped shackle which stradles the ferrule. The nubbins are preferably tapered in width and thickness to match the taper of the bore. The wedging action of the nubbins against the ferrule and cable prevents movement of the cable away from the ferrule. The cable may be removed from the shackle merely by hammering the nubbins toward the larger diameter portion of the axial bore. If, as is frequently the case, the cable breaks during use, the cable may be resecured to the ferrule by merely trimming the frayed end of the cable, inserting the cable through the axial bore in the ferrule and refastening the cable within the bore. The shackle preferably includes a reinforcing bar extending between opposite legs of the shackle between the ferrule and the curved portion of the U-shaped member.

BRIEF DESCRIPTION OF THE PREFERRED EMBODIMENT

Figure 1:
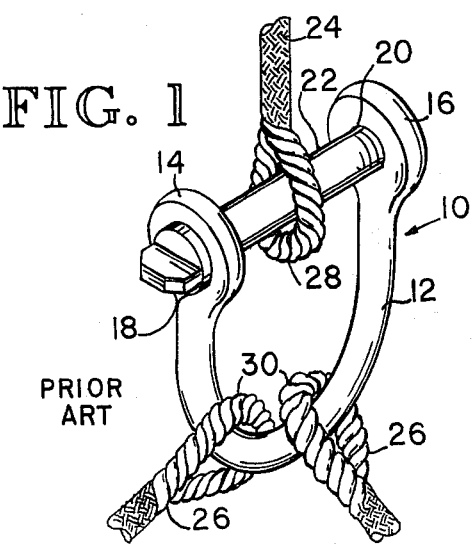
FIG. 1 is an isometric view of a prior art shackle connecting a main line cable to the ends of a chocker cable.

A conventional, commonly used shackle is illustrated in typical use in FIG. 1. The shackle 10 includes a generally U-shaped cylindrical member 12 having planar circular heads 14, 16 formed at opposite ends. Respective bores 18, 20 are formed in the heads 14, 16, and threads are formed in one of the bores 20. The bores 18, 20 receive a shackle pin 22 which slides through the bore 18 in the head 14 and is threaded into the bore 20 of the head 16.

A very common use for the prior art shackle 10 is the fastening of a main line cable 24 to one or more choker hook cables 26 in a logging operation. A loop 28 is formed at the end of the main line cable 24 by splicing the end of the cable 24 back upon itself. The shackle pin 22 is then inserted through the loop 28. Loops 30 are formed at the ends of the choker hooks 26 by the same procedure and the U-shaped member 12 is inserted through the loops 30. Although techniques have been developed for forming loops in cables without splicing, such as by clamping the end of the cable back upon itself, the loop-forming procedure is invariably somewhat time consuming. The time consuming nature of this procedure presents a serious problem since the main line cable 24 frequently breaks during use, thereby necessitating that a new loop be formed.

Figure 2:
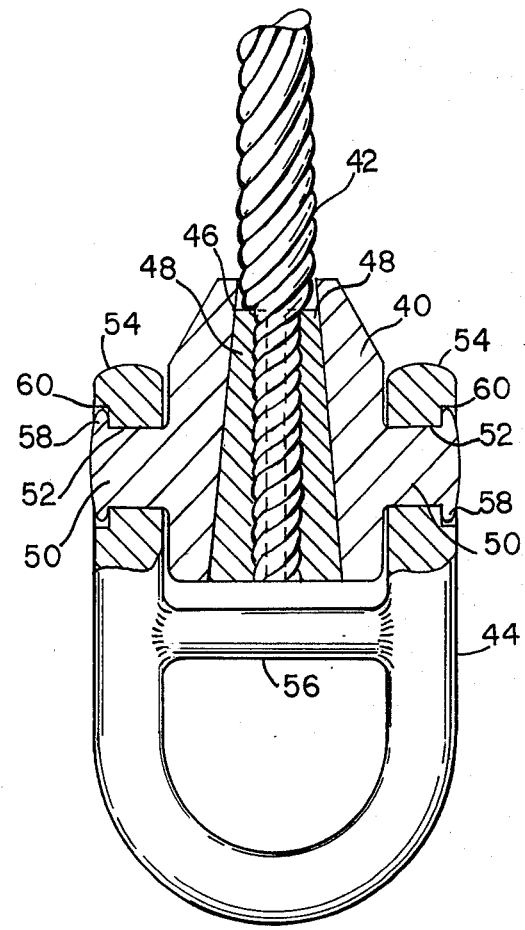
FIG. 2 is an exploded isometric view of the inventive cable connector.
Figure 3:
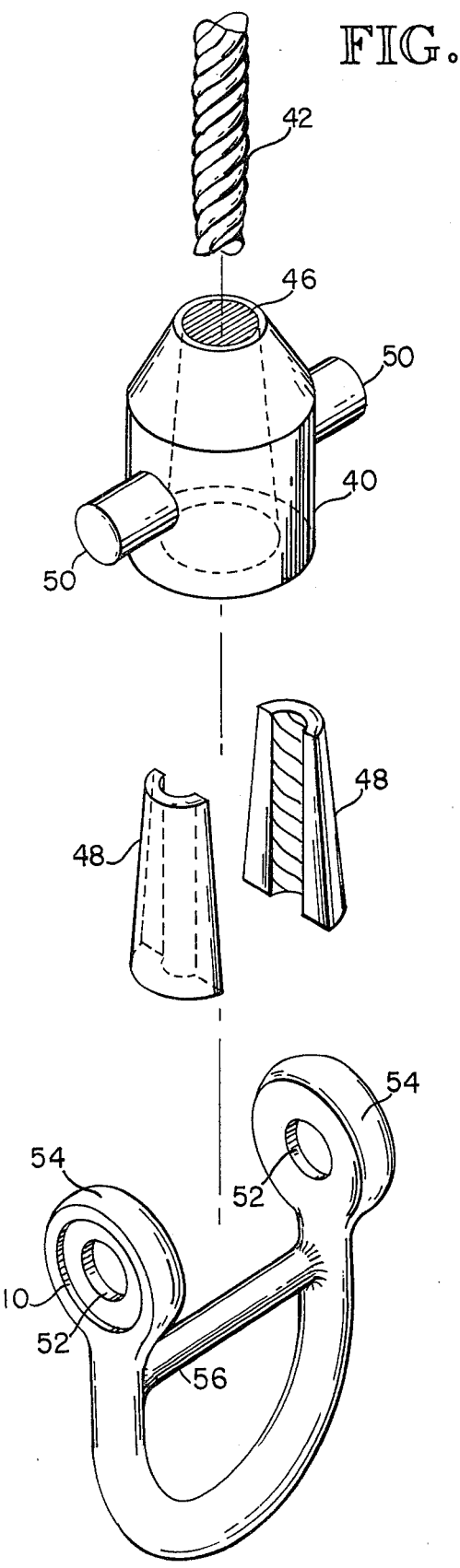
FIG. 3 is a cross-sectional view of the cable connector in assembled condition.

A shackle which largely solves the aforementioned problems is illustrated in FIGS. 2 and 3. This connector utilizes a generally cylindrical ferrule 40 for connecting the end of a main line cable 42 to a generally U-shaped shackle 44. The ferrule 40 has formed therein an axial bore 44 which tapers inwardly in the direction from which the cable 42 extends.

As best illustrated in FIG. 3, a pair of generally semi-cylindrical nubbins 46 which are tapered in thickness and width to match the taper of the bore 44 are positioned between the cable 42 and the ferrule 40 within the axial bore 44. The tapered thickness of the nubbins 46 causes the nubbins 46 to uniformly grip the cable, and the tapered width of the nubbins 46 causes the space between the nubbins 46, and hence the circumference of the cable 42 gripped by the nubbins 46, to be uniform along the length of the cable 42. It is also apparent from FIG. 3 that the thicker ends of the nubbins 46 are accessible at the ends of the ferrule 40 so that the nubbins 46 can be driven in place by hammering their thicker ends. The friction between the nubbins 46 and the cable 42 resulting from the nubbins 46 being hammered into the bore 44 securely fastens the cable 42 to the nubbin 40. Furthermore, as the axial tension on the cable 42 increases, the cable 42 exerts a force on the nubbins 46 which causes the frictional force of the nubbins 46 on the cable 42 to increase, further strengthening the connection between the cable 42 and the ferrule 40.

The inner surfaces of the nubbins 48 are preferably grooved to match the strands of the cable 42 in order to maximize the frictional forces between the cable 42 and the nubbins 48.

A pair of pins 50 project diametrically from opposite sides of the ferrule 40. The pins 50 are received by respective bores 52 formed at respective ends 54 of the U-shaped shackle 44. Since the pins 50 are slidably received in the bores 52, the U-shaped shackle 44 freely pivots with respect to the ferrule 40 so that the cable 42 may extend from the shackle 44 in any direction. A reinforcing bar 56 is secured to opposite legs of the shackle 44 after the pins 50 are positioned in the bores 52. The reinforcing pin 56 prevents the ends 54 of the shackle 44 from separating under extreme loads which would release the pins 50 from the bores 52. As best illustrated in FIG. 3, the pins 50 terminate in relatively large diameter portions 58 which are received by a recessed portion 60 of the ends 54 of the shackle 44.

In use the end of the cable 42 is cleanly trimmed and inserted in the bore 46 of the ferrule 40. The nubbins 48 are then inserted in the bore 46 between the cable 42 and the ferrule 40. A hammer of suitable size and weight is then used to strike the thicker ends of the nubbins 48 to drive them into the bore 46 so that they grip the cable 42 with increasing force. Loops formed at the end of choker hooks may then be placed around the shackle 44. When it is desired for the cable 42 to be removed from the ferrule, a thin, elongated tool similar in shape to a screwdriver is inserted in the narrower end of the bore 46 so that it contacts the narrower end of each nubbin 46. The tool is then struck with a hammer thereby driving the nubbins 48 from the ferrule 40 through the larger diameter end of the bore 46.

Similarly, if the cable 42 breaks during use, its frayed end 42 is cleanly trimmed and the broken end of the cable 42 is removed from the ferrule 40 as described above. The cable 42 can then be easily resecured to the ferrule 40 by workmen of even relatively modest skills.

Although the inventive shackle has been described as being used to secure a main line cable to a plurality of choker hook cables in a logging operation, it will be understood that the inventive connector may be used in any application where it is desired for one cable to be secured to another cable, eye, loop or similar structure.

I claim:

1. A cable connector for interconnecting a mainline cable with a plurality of choker cables, comprising:
    a generally u-shaped shackle having side arms in which aligned openings are formed;
    a pin bridging the space between the side arms of said shackle, said pin having the ends thereof freely rotatable in said openings and restraining means formed on the ends of said pin for preventing endwise movement thereof;
    a ferrule formed as an integral part of said pin and positioned midway between the side arms of said shackle, said ferrule having a tapered frustro-conically shaped centerbore through which said mainline cable extends;
    a cable fastening means comprising a pair of semi-frustro-conically shaped nubbins tapered to match the taper of the centerbore of said ferrule, said nubbins each having a semi-cylindrically shaped groove extending along the axis thereof which together form a central cylindrical passage through which said mainline cable extends and is frictionally held between said nubbins, said nubbins contacting the wall of said centerbore over the major surface area of said centerbore in order to maximize the strength and rigidity of said fastening means; and
    a reinforcing bar extending between said side arms to prevent either withdrawal of the ends of said pin from said openings or spreading of said arms of the shackle responsive to spreading forces applied to said shackle.

* * * * *